US008736485B2

(12) United States Patent
Schneider

(10) Patent No.: US 8,736,485 B2
(45) Date of Patent: May 27, 2014

(54) METHOD FOR DIRECTION FINDING BY MEANS OF MONOPULSE FORMATION

(75) Inventor: Robert Schneider, Burgrieden (DE)

(73) Assignee: EADS Deutschland GmbH, Ottobrunn (DE)

( * ) Notice: Subject to any disclaimer, the term of this patent is extended or adjusted under 35 U.S.C. 154(b) by 356 days.

(21) Appl. No.: 13/302,117

(22) Filed: Nov. 22, 2011

(65) Prior Publication Data

US 2012/0133548 A1 May 31, 2012

(30) Foreign Application Priority Data

Nov. 27, 2010 (EP) .................................. 10015062

(51) Int. Cl.
*G01S 7/40* (2006.01)
*G01S 13/44* (2006.01)
(52) U.S. Cl.
CPC ............... *G01S 7/40* (2013.01); *G01S 13/4445* (2013.01)
USPC ............................ 342/149; 342/152; 342/174
(58) Field of Classification Search
CPC . G01S 13/4445; G01S 13/42; G01S 13/4436; G01S 13/4454; G01S 3/023; G01S 3/14; G01S 7/4026; G01S 7/40; G01S 7/4004; H01Q 3/267
USPC .................... 342/149–152, 80, 165, 173–174
See application file for complete search history.

(56) References Cited

U.S. PATENT DOCUMENTS

| 4,689,623 | A | * | 8/1987 | Schwab et al. .................. 342/39 |
| 5,072,224 | A | * | 12/1991 | Verbeke et al. ............... 342/152 |
| 5,682,165 | A | * | 10/1997 | Lewis et al. ................... 342/174 |
| 5,864,317 | A | * | 1/1999 | Boe et al. ....................... 342/374 |
| 6,266,005 | B1 | * | 7/2001 | Schneider ..................... 342/123 |
| 6,313,783 | B1 | * | 11/2001 | Kuntman et al. ............... 342/32 |
| 7,006,032 | B2 | * | 2/2006 | King et al. ...................... 342/29 |
| 2012/0133548 | A1 | * | 5/2012 | Schneider ..................... 342/149 |

OTHER PUBLICATIONS

European Search Report with English Translation dated May 16, 2011 (three (3) pages).
Ulrich Nickel, "Overview of Generalized Monopulse Estimation", IEEE A&E Systems Magazine, vol. 21, No. 6, Jun. 2006, pp. 27-56.
Merrill I. Skolnik, "Radar Handbook", Library of Congress Cataloging-In-Publication Data, $2^{nd}$ Edition, 1990, (fourteen (14) pages).

* cited by examiner

*Primary Examiner* — John B Sotomayor
(74) *Attorney, Agent, or Firm* — Crowell & Moring LLP

(57) ABSTRACT

A method for direction finding by means of monopulse formation in a radar system with electronically controlled group antenna and analog beam shaping of sum and difference channels, a self-test of the antenna being carried out to identify failed receiving elements, and the result of the self-test going directly into the monopulse formation and the test thereby being error corrected. The result of the self-test is converted into correction values that, independently of the antenna viewing direction, are combined with those from the sum channel signal and the difference channel signals of the antenna.

4 Claims, 2 Drawing Sheets

METHOD FOR DIRECTION FINDING BY MEANS OF MONOPULSE FORMATION

CROSS REFERENCE TO RELATED APPLICATIONS

The present application priority under 35 U.S.C. §119 to European Patent Application No. 10 015 062.2, filed Nov. 27, 2010, the entire disclosure of which document is herein expressly incorporated by reference.

BACKGROUND AND SUMMARY OF THE INVENTION

Exemplary embodiments of the present invention relate to a method for direction finding by means of monopulse formation with the aid of a radar system with electronically controlled group antenna and analog beam formation of sum and difference channels.

Electronically controllable group antennas ("phased array antennas") comprise a linear or planar arrangement of a multiplicity of individual antenna elements with wide aperture angle that can be individually adjusted for their amplitude occupancy and phase occupancy and, when combined, produce a bundled antenna diagram (See, for example, Merrill Skolnik: Radar Handbook, 2nd edition; McGraw-Hill Book Company, Singapore, 1980). The viewing direction is adjusted by the phase occupancy, while the side lobe characteristic is defined by the amplitude occupancy (taper).

The output signals of the individual elements are usually physically added by high frequency antenna splitters ("combiners"), and to supply the output signal of the group antenna. The sum and difference diagrams for monopulse bearing measurement are formed by halving the total aperture and combining the sum signals of the halves in the so-called monopulse combiner at separate outputs with the same and opposite signs. The amplitude occupancy is, therefore, necessarily identical for the sum and difference diagrams.

The monopulse discriminant $$r = \text{Im}\left\{\frac{\Delta}{\Sigma}\right\} \quad (1)$$

can be formed as basis for the monopulse bearing measurement from the signal of the sum antenna $\Sigma$ and that of the difference antenna $\Delta$.

For the two-dimensional case, the aperture is divided into horizontal (x-) and vertical (y-) directions, which leads to the two difference signals $\Delta_x$ and $\Delta_y$, which yield the monopulse discriminants $$r_x = \text{Im}\left\{\frac{\Delta_x}{\Sigma}\right\} \quad (2)$$

$$r_y = \text{Im}\left\{\frac{\Delta_y}{\Sigma}\right\}$$

for horizontal and vertical direction finding.

Assuming identical antenna diagrams of the aperture halves, the bearing values in u- and v-coordinates are yielded therefrom in the form of the angular offsets $\delta u$, $\delta u$ of the antenna viewing direction in accordance with $$\delta u = \frac{2}{k_0 d_x} \cdot \arctan(r_x) \quad (3)$$

$$\delta v = \frac{2}{k_0 d_y} \cdot \arctan(r_y).$$

In this case, the wavenumber at the radar operating frequency $f_0$, is denoted by $k_0 = 2\pi f_0/c_0$, $d_x$ and $d_y$, are the phase center spacings of the respective aperture halves in horizontal and vertical directions.

In practice, the partial apertures do not have identical diagrams, but equation 3 constitutes a very good approximation in the region of the main lobe of the sum diagram, as long as it is possible to carry out a symmetrical division of the apertures (for example rectangular, circular or elliptical planar antennas). The useful bearing range typically extends to a drop of approximately 12 dB of the main lobe.

The functional relationship between $\delta u$, $\delta v$, and $r_x$, $r_y$ is denoted as monopulse characteristic. In order to determine small offsets about the antenna viewing direction, the latter is frequently linearized with the slopes in the zero crossing in u- and v-directions in accordance with $$m_u = \frac{2}{k_0 d_x} \quad (4)$$

$$m_v = \frac{2}{k_0 d_y}$$

The positions $x^{(n)}$, $y^{(n)}$ of the phase centers of the partial apertures are determined by forming the centroid over all individual elements of which the respective aperture half is composed (with $n \in \{r, l, o, u\}$ for the right, left, upper and lower halves). The phase center coordinates are calculated as $$x^{(n)} = \frac{\sum_v x_{e,v}^{(n)} \cdot g_{e,v}^{(n)}}{\sum_v g_{e,v}^{(n)}} \quad (5)$$

$$y^{(n)} = \frac{\sum_v y_{e,v}^{(n)} \cdot g_{e,v}^{(n)}}{\sum_v g_{e,v}^{(n)}}$$

from the coordinates $x_{e,v}^{(n)}$, $y_{e,v}^{(n)}$ and the amplitude weightings $g_{e,v}^{(n)}$ of the individual elements of a partial aperture, from which, finally, the phase center spacings of the horizontal and vertical aperture halves are yielded as:

$$d_x = x^{(r)} - x^{(l)}$$

$$d_y = y^{(o)} - y^{(u)} \quad (6)$$

It follows that all the variables are known for carrying out conventional monopulse bearing measurement from the sum signal and the difference signals of an ideal (error free) group antenna.

Deviations from the ideal aperture occupancy—in particular, symmetry errors—lead to bearing errors. Deterministic causes of such deviations are, for example, individual failed elements or entire groups of elements (rows, planks, slats).

The (systematic) monopulse bearing error $\{\epsilon_u, \epsilon_v\}$ can be ascertained by calculating the bearing $\{\delta u, \delta v\}$ in accordance with equation 3 at arbitrary positions $\{u,v\}$ in the monopulse definition range about the antenna viewing direction $\{u_{ant}, v_{ant}\}$ and determining the difference with respect to the actual position in u and v:

$$\epsilon_u = u - u_{ant} - \delta u$$

$$\epsilon_v = v - v_{ant} - \delta v \quad (7)$$

Here, the values of the corresponding antenna diagrams in the direction $\{u,v\}$ are to be substituted for $\Sigma$, $\Delta_x$, and $\Delta_y$. In the noise-free case, these are identical to the signals that supply the antenna for an incident wavefront from direction $\{u,v\}$.

The absolute value of the total bearing error amounts to $$\epsilon = \sqrt{\epsilon_u^2 + \epsilon_v^2} \quad (8)$$

The effect of errors on the aperture occupancy is illustrated by way of example with the aid of the simulation of a two-dimensional, circular group antenna with 1000 elements in the X-band, which are arranged in a triangular array. FIG. 1 visualizes position and amplitudes of the individual elements in a normalized linear scale. An occupancy that drops toward the edge to −15 dB (approximately 0.2) is undertaken for side lobe reduction. It may be assumed that the aperture is composed structurally of vertical half lines, of which four are blank, giving rise to symmetry errors in the horizontal and vertical directions.

Magnitude errors of the monopulse bearing measurement in accordance with equations 3 to 8 inside the bearing range are illustrated as encoded in gray levels in FIG. 2 and FIG. 3. Adopted here as limit of the bearing range is the 6 dB drop of the sum diagram, which for this antenna describes approximately a circle of radius 0.05 about the viewing direction (here: $\{u_{ant}, v_{ant}\}$) in the u/v plane. This range comprises approximately half the entire main lobe width, or 1.5 times the 3 dB lobe width.

Only slight deviations at the edge of the range can be established for the error-free aperture occupancy (FIG. 2). They reach a maximum value of 3% with reference to the maximum bearing value. Assuming aperture errors (FIG. 3), the maximum bearing error rises substantially up to 15%.

Bearing errors are tolerated within certain limits in relation to the current prior art for radar systems with electronically swiveled group antennas whose sum and difference diagrams are analogously formed.

In the general case of a group antenna, the sum and difference diagrams are not, as described above, formed by combination on the high frequency side (physical, analog), but the received signals of the individual elements are firstly available individually. After they have been digitized, it is then possible to carry out arbitrary beam shaping, and thus also monopulse bearing measurement, digitally (digital beam forming, DBF), by multiplying and adding up the element signals numerically with complex weighting factors. Although this does require a substantially greater outlay on hardware for the antenna, the result nevertheless is many degrees of freedom in configuring their properties.

With regard to the monopulse calculation, the limitation that sum and difference diagrams are formed with one and the same amplitude occupancy is abolished, and so optimal solutions are possible here. On the basis of the maximum likelihood estimate (MLE), weighting factors are found for forming the sum and difference diagrams in which it is also possible to take account of deviations from the idealized antenna aperture. An example of this is thinned arrays.

The algorithms and various aspects of such a generalized monopulse are described, for example, in Ulrich Nickel: Overview of Generalized Monopulse Estimation; IEEE A&E Systems Magazine, Vol. 21, No. 6, June 2006, Part 2: Tutorials, pp. 27-56.

The fundamental idea of the generalized monopulse according to the Nickel article consists in determining adapted monopulse bearing values $\delta u_{ad}$ and $\delta u_{ad}$ from the monopulse discriminants (equation 2) of the faulty antenna by means of an affine mapping (simple displacement and linear transformation). This is described in the form of a linear equation system:

$$\begin{pmatrix} \delta u_{ad} \\ \delta v_{ad} \end{pmatrix} = C \cdot \begin{pmatrix} r_x - \mu_x \\ r_y - \mu_y \end{pmatrix} \quad (9)$$

Slope and bias of the monopulse bearing measurement in the antenna viewing direction are thereby adapted to the real conditions.

The correction terms C and $\mu_{x,y}$ are derived from the requirements that in the viewing direction $$\delta u_{ad}(u_{ant}, v_{ant}) = 0$$

$$\delta v_{ad}(u_{ant}, v_{ant}) = 0 \quad (10)$$

must hold, as must $$\begin{pmatrix} \frac{\partial \delta u_{ad}}{\partial u} & \frac{\partial \delta u_{ad}}{\partial v} \\ \frac{\partial \delta v_{ad}}{\partial u} & \frac{\partial \delta v_{ad}}{\partial v} \end{pmatrix}\Bigg|_{(u_{ant}, v_{ant})} = \begin{pmatrix} 1 & 0 \\ 0 & 1 \end{pmatrix} \quad (11)$$

for the partial derivatives (slopes) thereof.

This approach includes the simplified assumption of a linearization about the point of the viewing direction, something which then facilitates a closed solution for C and $\mu_{x,y}$ as a function of the variables describing the antenna. The derivation and general solution (in vector notation) are described in the Nickel article.

The application of the generalized monopulse according to the Nickel article is, however, not suitable for the correction of moderate aperture errors. In particular, the linearization undertaken in its formulation according to equation 9 leads, for relatively large offsets of the antenna viewing direction, to errors that are larger than those typically caused by failed antenna elements.

Exemplary embodiments of the present invention are directed to obtaining a bearing with high accuracy when applying monopulse bearing measurement on a group antenna with analog beam shaping of sum and difference diagrams even given a disturbed aperture occupancy of the antenna.

The concept of the generalized monopulse known from the prior art is modified in accordance with the invention in order to take account of previously known deviations in the aperture occupancy from the ideal case during monopulse calculation, even given group antennas with analog beam shaping of sum and difference channels.

It is often known in a total radar system, from cyclically conducted self-tests (health check, built-in tests, for example in the case of each system start), which elements of the antenna receiving aperture (individual elements or planks or slats) have failed. This information is used in accordance with the invention in order to calculate an error-corrected monopulse bearing measurement.

Moreover, known amplitude and phase errors of the receiving elements can also be involved in the correction.

However, structural deviations in the antenna aperture from the ideal case of symmetrical divisibility (for example in relation to the implementation of structurally conformal antennas) are known from the start and can be taken into account in the correction.

An extended maintenance-free operation of the group antenna can be ensured by means of the invention without having to decrease the bearing accuracy.

BRIEF DESCRIPTION OF THE DRAWINGS

In the following, with the aid of the attached drawings, an exemplary embodiment of the invention will be addressed in further detail.

The invention is explained in more detail with the aid of exemplary embodiments and with reference to figures, in which.

DETAILED DESCRIPTION OF THE DRAWINGS

Figure 1:
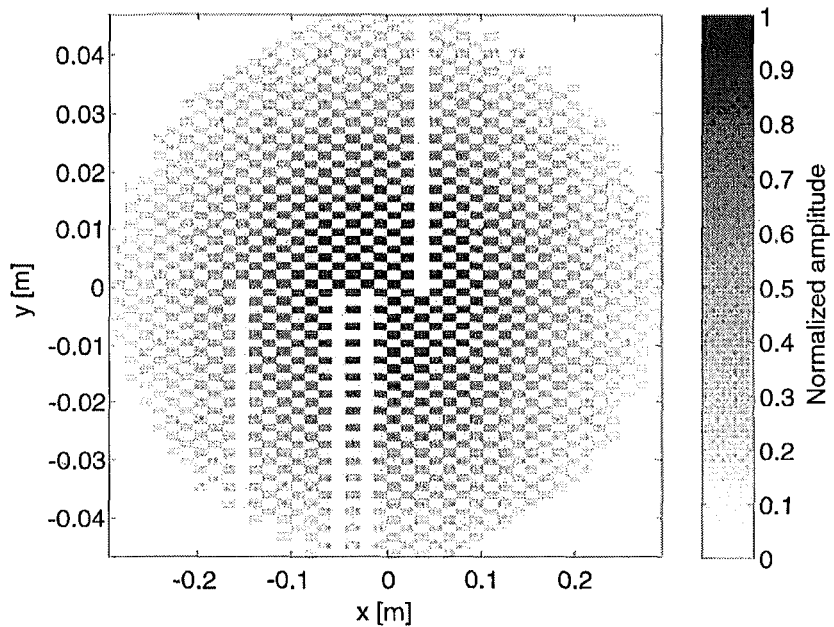
FIG. 1: shows aperture occupancy of a two-dimensional group antenna on the assumption of four blank half lines.

In accordance with the invention, the mapping for determining the adapted monopulse bearing values $\delta u_{corr}$ and $\delta v_{corr}$ from the monopulse discriminants $r_{x,y}$ (equation 2) of the faulty antenna is described by means of the following linear equation system:

$$\begin{pmatrix} \delta u_{corr} \\ \delta v_{corr} \end{pmatrix} = C \cdot \begin{pmatrix} \arctan(r_x) - \mu_x \\ \arctan(r_y) - \mu_y \end{pmatrix} \quad (12)$$

Taking account of the nonlinear relationship between the monopulse discriminant and the bearing values in the form of the arctan function allows the monopulse bearing to be corrected with the required accuracy in the entire bearing range.

The following variables are required to determine the correction terms C and $\mu_{x,y}$ in the inventive case of a group antenna with analog beam shaping of sum and difference channels:

- the positions $x_n$ and $y_n$ of all the individual elements on the aperture relative to the center, and
- the actual amplitude weightings $g_n$, of all the individual elements on the aperture (for failed elements, $g_n=0$ is to be set, the corresponding complex amplitude in the case of known amplitude and/or phase errors).

The following result is therefore obtained for the displacement correction terms $\mu_{x,y}$ in scalar notation that can be directly implemented:

$$\mu_x = \text{Im}\left\{ \frac{\sum_n g_n^* \cdot \text{sgn}(x_n)}{\sum_n g_n^*} \right\} \quad (13)$$

$$\mu_x = \text{Im}\left\{ \frac{\sum_n g_n^* \cdot \text{sgn}(y_n)}{\sum_n g_n^*} \right\}$$

The matrix of the linear transformation $$C = D^{-1} = \begin{pmatrix} d_{11} & d_{12} \\ d_{21} & d_{22} \end{pmatrix}^{-1} \quad (14)$$

is yielded as the inverse of the 2×2 matrix D formed from the elements $$d_{11} = \frac{\text{Im}\left\{ jk_0 \left( \sum_n g_n^* x_n \text{sgn}(x_n) \cdot \sum_n g_n - \sum_n g_n^* \text{sgn}(x_n) \cdot \sum_n g_n x_n \right) \right\}}{\left|\sum_n g_n\right|^2} - 2\mu_x \cdot \text{Re}\left\{ \frac{jk_0 \sum_n g_n^* x_n}{\sum_n g_n^*} \right\} \quad (15)$$

$$d_{12} = \frac{\text{Im}\left\{ jk_0 \left( \sum_n g_n^* y_n \text{sgn}(x_n) \cdot \sum_n g_n - \sum_n g_n^* \text{sgn}(x_n) \cdot \sum_n g_n y_n \right) \right\}}{\left|\sum_n g_n\right|^2} - 2\mu_x \cdot \text{Re}\left\{ \frac{jk_0 \sum_n g_n^* y_n}{\sum_n g_n^*} \right\}$$

$$d_{21} = \frac{\text{Im}\left\{ jk_0 \left( \sum_n g_n^* x_n \text{sgn}(y_n) \cdot \sum_n g_n - \sum_n g_n^* \text{sgn}(y_n) \cdot \sum_n g_n x_n \right) \right\}}{\left|\sum_n g_n\right|^2} - 2\mu_y \cdot \text{Re}\left\{ \frac{jk_0 \sum_n g_n^* x_n}{\sum_n g_n^*} \right\}$$

$$d_{22} = \frac{\text{Im}\left\{ jk_0 \left( \sum_n g_n^* y_n \text{sgn}(y_n) \cdot \sum_n g_n - \sum_n g_n^* \text{sgn}(y_n) \cdot \sum_n g_n y_n \right) \right\}}{\left|\sum_n g_n\right|^2} - 2\mu_x \cdot \text{Re}\left\{ \frac{jk_0 \sum_n g_n^* y_n}{\sum_n g_n^*} \right\}$$

For purely real $g_n$, such as are to be assumed for failed elements and intentional structural asymmetries, the $\mu_{x,y}$ vanish, and so the correction of the bias is eliminated, and the calculation of the $d_{ij}$ is also greatly simplified to $$d_{11} = k_0 \frac{\sum_n g_n x_n \text{sgn}(x_n) \cdot \sum_n g_n - \sum_n g_n \text{sgn}(x_n) \cdot \sum_n g_n x_n}{(\sum_n g_n)^2} \quad (16)$$

-continued $$d_{12} = k_0 \frac{\sum g_n y_n \mathrm{sgn}(x_n) \cdot \sum g_n - \sum g_n \mathrm{sgn}(x_n) \cdot \sum g_n y_n}{(\sum g_n)^2}$$

$$d_{21} = k_0 \frac{\sum g_n x_n \mathrm{sgn}(y_n) \cdot \sum g_n - \sum g_n \mathrm{sgn}(y_n) \cdot \sum g_n x_n}{(\sum g_n)^2}$$

$$d_{22} = k_0 \frac{\sum g_n y_n \mathrm{sgn}(y_n) \cdot \sum g_n - \sum g_n \mathrm{sgn}(y_n) \cdot \sum g_n y_n}{(\sum g_n)^2}$$

By contrast with the conventional monopulse with the equations 2, 3, 5 and 6, in the calculation of which the desired amplitude weightings of the antenna elements feature in addition to the positions, in this case it is the actual weights (equations 2, 9, 13, 14 and 15) that feature.

Figure 4:
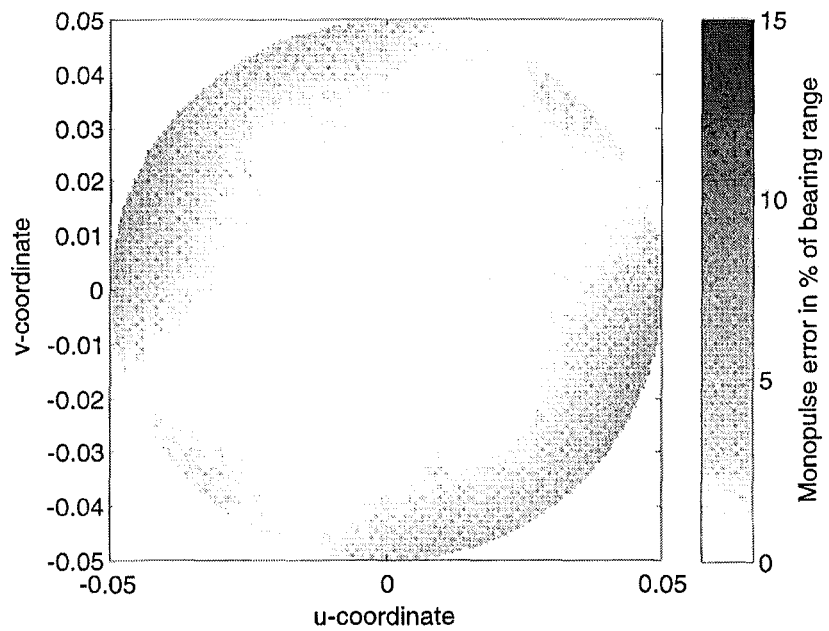
FIG. 4: shows bearing errors of corrected monopulse bearing measurement given symmetry errors caused by blank half lines on the aperture.
Figure 2:
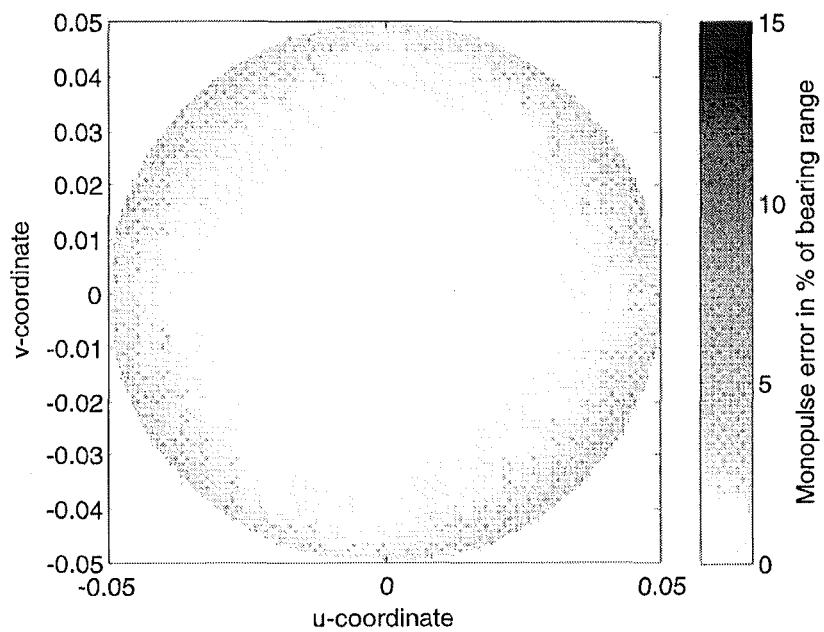
FIG. 2: shows bearing errors of conventional monopulse bearing measurement for an error free aperture occupancy.
Figure 3:
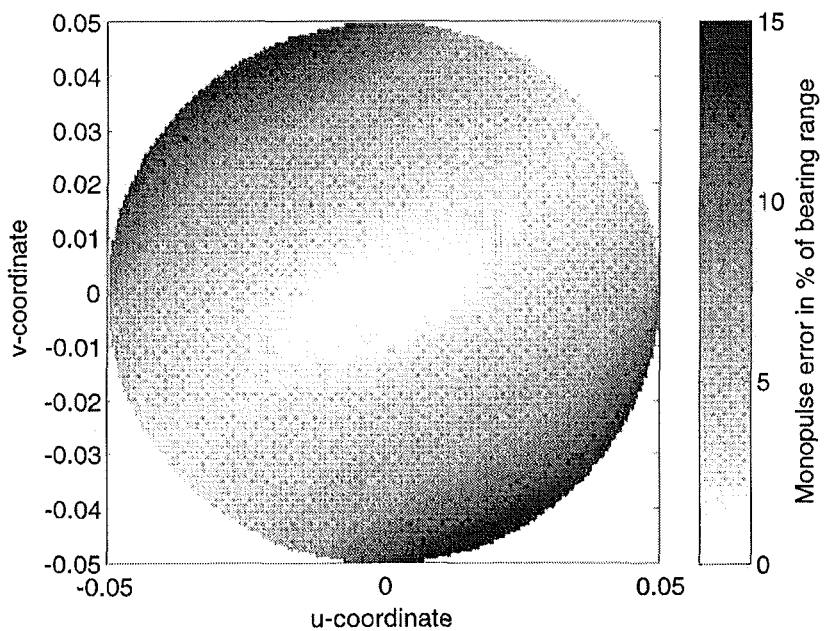
FIG. 3: shows bearing errors of conventional monopulse bearing measurement given symmetry errors caused by blank half lines on the aperture.

For the case, considered by way of example, of an antenna with blank half lines, the resulting bearing errors for the application of the monopulse corrected in accordance with the invention are illustrated in FIG. 4. By comparison with the conventional monopulse (FIG. 3), there is a substantial reduction in maximum errors.

For a quantitative assessment of the improvement potential of the inventive corrected monopulse bearing measurement, the following table specifies comparative values of the mean square errors within the entire bearing range. The corrected monopulse in accordance with this invention can therefore be used to achieve bearings that are only insubstantially worsened by comparison with the ideal state for the antenna considered, even given the blanking of four half lines. Small errors such as, for example, individual failed elements are virtually completely corrected.

| Aperture state | Monopulse method | Bearing error |
| --- | --- | --- |
| Ideal | Conventional monopulse | 1.8% rms |
| 4 planks failed | Conventional monopulse | 6.6% rms |
| 4 planks failed | Corrected monopulse | 2.2% rms |

The additional outlay for the corrected monopulse bearing measurement is limited substantially to the calculation of the correction terms C and $\mu_{x,y}$ (only C for real $g_n$), which need be carried out, however, only once in order to adapt to the given non-ideal antenna properties, or when the latter change (for example after starting of the system with self-testing in order to identify failed elements). The actual correction procedure during operation comprises only the application of equation 12, and this signifies an only minimal extra outlay by comparison with the conventional monopulse (equation 3).

The methods described above can be performed by a microprocessor executing computer code loaded from a computer-readable medium and/or by a special purpose process, such as an application specific integrated circuit (ASIC), field programmable gate array (FPGA), etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for direction finding by means of monopulse formation in a radar system with electronically controlled group antenna and analog beam shaping of sum and difference channels, the method comprising:
   performing a self-test of the antenna to identify failed receiving elements, and a result of the self-test goes directly into the monopulse formation and said test is thereby error corrected;
   converting the result of the self-test into correction values (C, $\mu_x$, $\mu_y$) that, independently of the antenna viewing direction, are combined as follows with those from the sum channel signal ($\Sigma$) and the difference channel signals ($\Delta_x, \Delta_y$) of the antenna:

$$\begin{pmatrix} \delta u_{corr} \\ \delta v_{corr} \end{pmatrix} = C \cdot \begin{pmatrix} \arctan\left(\mathrm{Im}\left\{\frac{\Delta_x}{\Sigma}\right\}\right) - \mu_x \\ \arctan\left(\mathrm{Im}\left\{\frac{\Delta_y}{\Sigma}\right\}\right) - \mu_y \end{pmatrix},$$

$\delta u_{corr}$ and $\delta v_{corr}$ being the corrected bearing values.

2. The method as claimed in claim 1, wherein the following parameters of group antenna feature in the calculation of the correction values (C, $\mu_x$, $\mu_y$):
   positions ($x_n$, $y_n$) of the receiving elements on an antenna aperture relative to the center thereof, and
   actual amplitude weightings ($g_n$) of the receiving elements on the antenna aperture.

3. The method as claimed in claim 1, wherein, in addition to the failed receiving elements identified by the self-test, known amplitude and phase errors of the receiving elements, or structural deviations of an antenna aperture from an ideal case of a symmetrical divisibility, also feature in the monopulse formation.

4. The method as claimed in claim 2, wherein, in addition to the failed receiving elements identified by the self-test, known amplitude and phase errors of the receiving elements, or structural deviations of the antenna aperture from an ideal case of a symmetrical divisibility, also feature in the monopulse formation.

* * * * *